(12) United States Patent
Khandelwal et al.

(10) Patent No.: US 11,061,745 B2
(45) Date of Patent: Jul. 13, 2021

(54) SHARED RESOURCE ANALYSIS FOR EMBEDDED MULTI-CORE SYSTEMS

(71) Applicant: Infineon Technologies AG, Neubiberg (DE)

(72) Inventors: Sumit Khandelwal, Bangalore (IN); Sandeep Chandrashekar, Bangalore (IN); Akhila Shamsunder, Bangalore (IN); Swasati Baishya, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 56 days.

(21) Appl. No.: 16/189,164

(22) Filed: Nov. 13, 2018

(65) Prior Publication Data
US 2020/0151034 A1 May 14, 2020

(51) Int. Cl.
*G06F 9/54* (2006.01)
*G06F 9/46* (2006.01)
(Continued)

(52) U.S. Cl.
CPC ............ *G06F 9/544* (2013.01); *G06F 9/3877* (2013.01); *G06F 9/468* (2013.01); *G06F 9/4843* (2013.01);
(Continued)

(58) Field of Classification Search
CPC ................................ G06F 9/544; G06F 9/3877
(Continued)

(56) References Cited

U.S. PATENT DOCUMENTS 8,479,166 B2 *  7/2013  Nir-Buchbinder ........ G06F 9/52
                                                      717/126
8,595,346 B2 * 11/2013  Bairavasundaram ........................
                                                    G06F 9/5011
                                                      709/223
(Continued)

OTHER PUBLICATIONS

Alfranseder, Martin, et al. "An efficient spin-lock based multi-core resource sharing protocol." 2014 IEEE 33rd International Performance Computing and Communications Conference (IPCCC). IEEE, 2014.pp. 1-7 (Year: 2014).*
(Continued)

*Primary Examiner* — Satish Rampuria
(74) *Attorney, Agent, or Firm* — Eschweiler & Potashnik, LLC (57) ABSTRACT

Various embodiments discussed herein systems and methods that facilitate analysis of shared resources for a multi-core system. One example embodiment comprise a method involving identifying, via static data based on analysis of the multi-core system, shared resource(s) of the multi-core system that are subject to potential resource violation(s), wherein the static data identifies each read and write access of those shared resource(s) in a software of the multi-core system; receiving hardware trace data for the multi-core system comprising each read and write access of those shared resource(s) in the software as executed by the multi-core system; and making a determination, for each shared resource of the one or more shared resources, based on a comparison between the static data and the hardware trace data, whether at least one of the one or more associated potential resource violations of that shared resource is an associated resource violation of that shared resource.

16 Claims, 5 Drawing Sheets

(51) Int. Cl.
  *G06F 11/34*  (2006.01)
  *G06F 9/38*   (2018.01)
  *G06F 9/50*   (2006.01)
  *G06F 9/48*   (2006.01)

(52) U.S. Cl.
  CPC ............ *G06F 9/5005* (2013.01); *G06F 9/542* (2013.01); *G06F 11/3495* (2013.01)

(58) Field of Classification Search
  USPC .................................................. 718/1–108
  See application file for complete search history.

(56) References Cited

U.S. PATENT DOCUMENTS

| 2013/0239094 | A1* | 9/2013 | Nir-Buchbinder | G06F 9/52 717/126 |
|---|---|---|---|---|
| 2017/0206619 | A1* | 7/2017 | Cho | G06Q 50/265 |
| 2019/0158419 | A1* | 5/2019 | Certain | G06Q 10/00 |

OTHER PUBLICATIONS

Nesbit, Kyle J., et al. "Multicore resource management." IEEE micro 28.3 (2008): pp. 6-16. (Year: 2008).*

Stattelmann, Stefan, Oliver Bringmann, and Wolfgang Rosenstiel. "Fast and accurate resource conflict simulation for performance analysis of multi-core systems." 2011 Design, Automation & Test in Europe. IEEE, 2011. pp. 1-6 (Year: 2011).*

Levy, Markus, and Thomas M. Conte. "Embedded multicore processors and systems." IEEE micro 29.3 (2009): pp. 7-9. (Year: 2009).*

Hong, Jung-Hyun, et al. "Design of OpenCL framework for embedded multi-core processors." IEEE Transactions on Consumer Electronics 60.2 (2014): pp. 233-241. (Year: 2014).*

Fernández, Mikel, et al. "Assessing the suitability of the NGMP multi-core processor in the space domain." Proceedings of the tenth ACM international conference on Embedded software. 2012.pp. 175-184 (Year: 2012).*

* cited by examiner

SHARED RESOURCE ANALYSIS FOR EMBEDDED MULTI-CORE SYSTEMS

FIELD

The present disclosure relates to multi-core systems, and more specifically to systems and methods that can be employed for shared resource analysis in connection with multi-core systems.

BACKGROUND

Multi-core systems frequently employ resources (e.g., variables, special function registers (SFRs), etc.) that are shared between the cores of the multi-core system. Because of this, the potential exists for shared resource violations to occur (e.g., from concurrency and synchronization issues, etc.). However, existing techniques for detecting unintentional and problematic accesses to shared resources have multiple disadvantages.

Some existing techniques involve detection of violations in atomic access mechanisms of hardware (HW) resources; however, no standard atomic access mechanism is available in HW to ensure coherent access of resources. As one example, the result of the write access to a register of a HW unit could be reflected in a read-only status register. Further control flow in another core and/or in the same core may depend on the values updated in the status register. The correctness of this sequence of accesses (or other similar examples) from two cores cannot be verified by any HW mechanism.

Other existing techniques employ manual inspection carried out to detect any resource violations during architecture and design phases. However, such techniques are not standardized and are subjective.

Additionally, existing techniques provide no systematic method to predict and avoid incorrect use of protection mechanism(s) that could lead to unpredictable behavior of the hardware (for example, a non-optimal and incorrect spinlock address used to protect a shared SFR).

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Embodiments disclosed herein can comprise systems and/or methods that can be implemented during the design and implementation phase that can facilitate detecting, predicting, and mitigating shared resource violations over access of hardware resources and hardware sequences. In various embodiments, techniques discussed herein can facilitate analysis on a granular level on all types of shared resources being used in all contexts at the system level. Additionally, embodiments discussed herein can facilitate a systematic analysis for demonstrating FFI (Freedom From Interference) between elements of different ASILs (Automotive Safety Integration Levels). Various embodiments can facilitate performance of a comprehensive analysis in a meticulous and a standardized manner to predict and mitigate measures for: (1) Concurrency and synchronization issues, by ensuring usage of the correct protection mechanism(s) and (2) Resource conflicts between interrupt and task context. The comprehensive analysis of embodiments discussed herein can be automated at least in part to reduce manual error, minimize time consumption, reduce project cost, and improve product quality.

In various embodiments, resource violations, mitigation measure(s) and HW-SW (Software) sequences obtained from static analysis can be provided as an input to the dynamic analysis section of a method (or dynamic analysis performed by a resource violation checker of a system) according to various aspects discussed herein. Additionally, in various embodiments, a HW trace can also be provided as input for the dynamic analysis (of the method or resource violation checker), which can be compared with the input from the static analysis.

In various embodiments, the static analysis can provide measure(s) to avoid resource violations, and the dynamic analysis can verify these measures. Additionally, in aspects, dynamic analysis can be triggered separately (e.g., on-demand, etc.). In situations wherein the verification fails in dynamic analysis, a notification can be provided to the user. Thus, FFI can be ensured in a robust manner.

Figure 1:
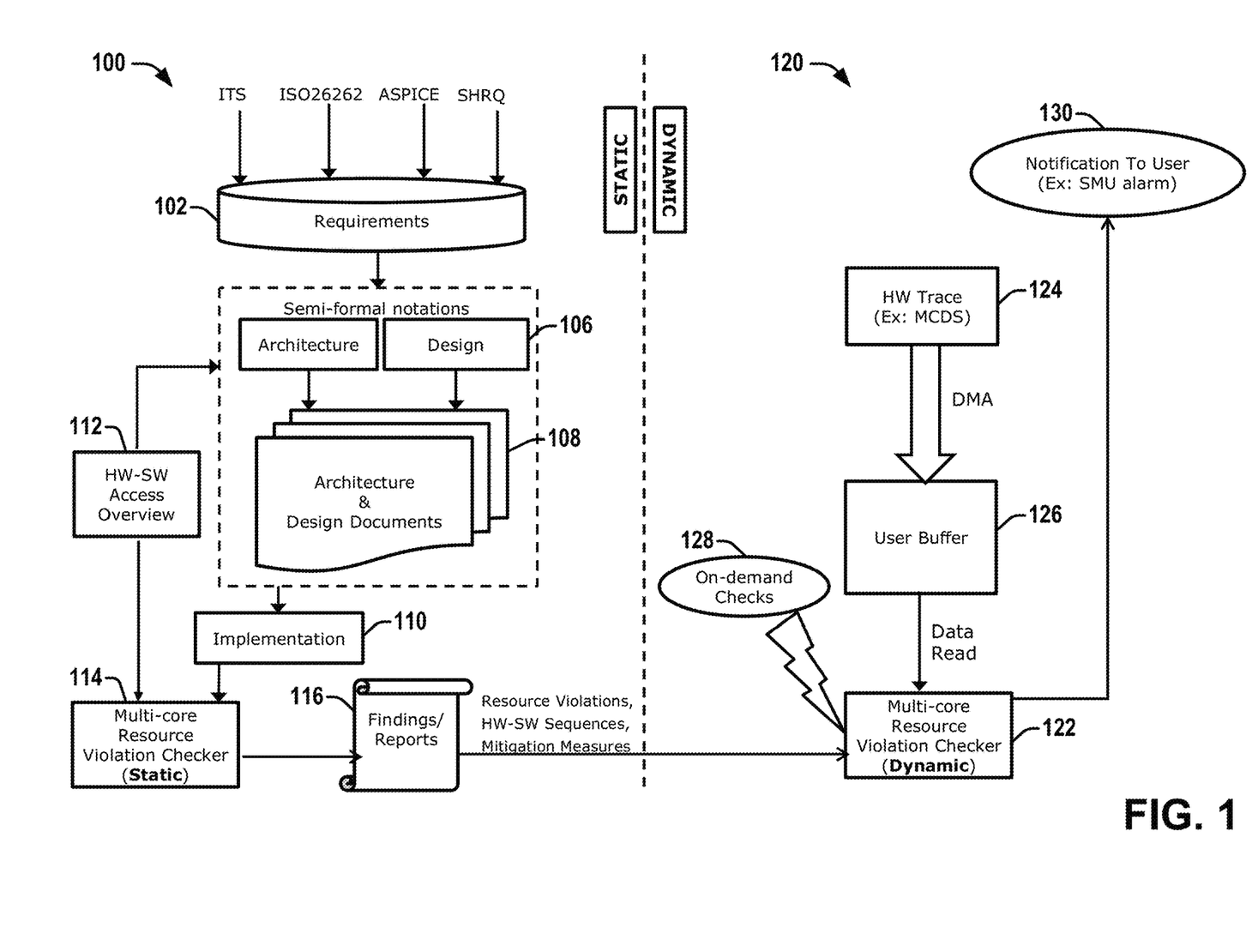
FIG. 1 is a diagram illustrating an example implementation of a multi-core resource violation checker, according to various aspects described herein.

Referring to FIG. 1, illustrated is a diagram of an example implementation of a multi-core resource violation checker, according to various aspects discussed herein. Systems and methods for multi-core resource violation checking discussed herein can involve both static analysis 100 and dynamic analysis 120.

Similar to existing techniques, based on requirements 102 (e.g., ITS, ISO 26262, ASPICE, SHRQ, etc.), an architecture phase 104 and a design phase 106 can be performed, and can be used to generate architecture and design documents 108. In various aspects, semi-formal notation (e.g., UML (Unified Modeling Language) modeling, etc.) can be employed in the architecture phase 104 and design phase 106. Based on architecture phase 104, design phase 106, and documents 108, an implementation phase 110 can be performed to create a multi-core system. However, existing techniques do not provide a systematic approach for detecting and mitigating shared resource violations.

Accordingly, in various aspects described herein, systems and techniques can be employed for systematic detection and mitigation of shared resource violations.

In various embodiments, fault detection can be systematically carried out at the design and architecture phases 104 and 106, with the aid of semi-formal notation such as UML modeling.

Based on hardware-software interaction, an overview of HW-SW access 112 can be generated, which can be analyzed via a static phase/portion of multi-core resource violation checking at 114. Based on the analysis at 114, findings and/or reports can be generated at 116. In various embodiments, multi-core access for common resources across the cores of the multi-core system can be identified for atomic usage of resources in an automated or at least partly automated manner. Additionally, shared resource analysis performed across different functional units can be aided by the automated approach(es) discussed herein.

During the static phase 100, static data can be generated (e.g., in the form of findings/reports 116, etc.) based on a systematic and exhaustive analysis of all HW SFRs and data accesses (e.g., for a plurality of SFRs and/or variables, each read access and each write access to that SFR/variable can be analyzed, etc.), wherein the static data (e.g., comprising semi-formal notation, etc.) can identify shared resource violations (e.g., of resources subject to two or more write accesses, etc.) such as concurrency issue(s) (e.g., deadlock(s), race condition(s)), etc., associated HW-SW sequences (e.g., indicating the order of read and write accesses, etc.), along with potential mitigation measures.

Figure 2:
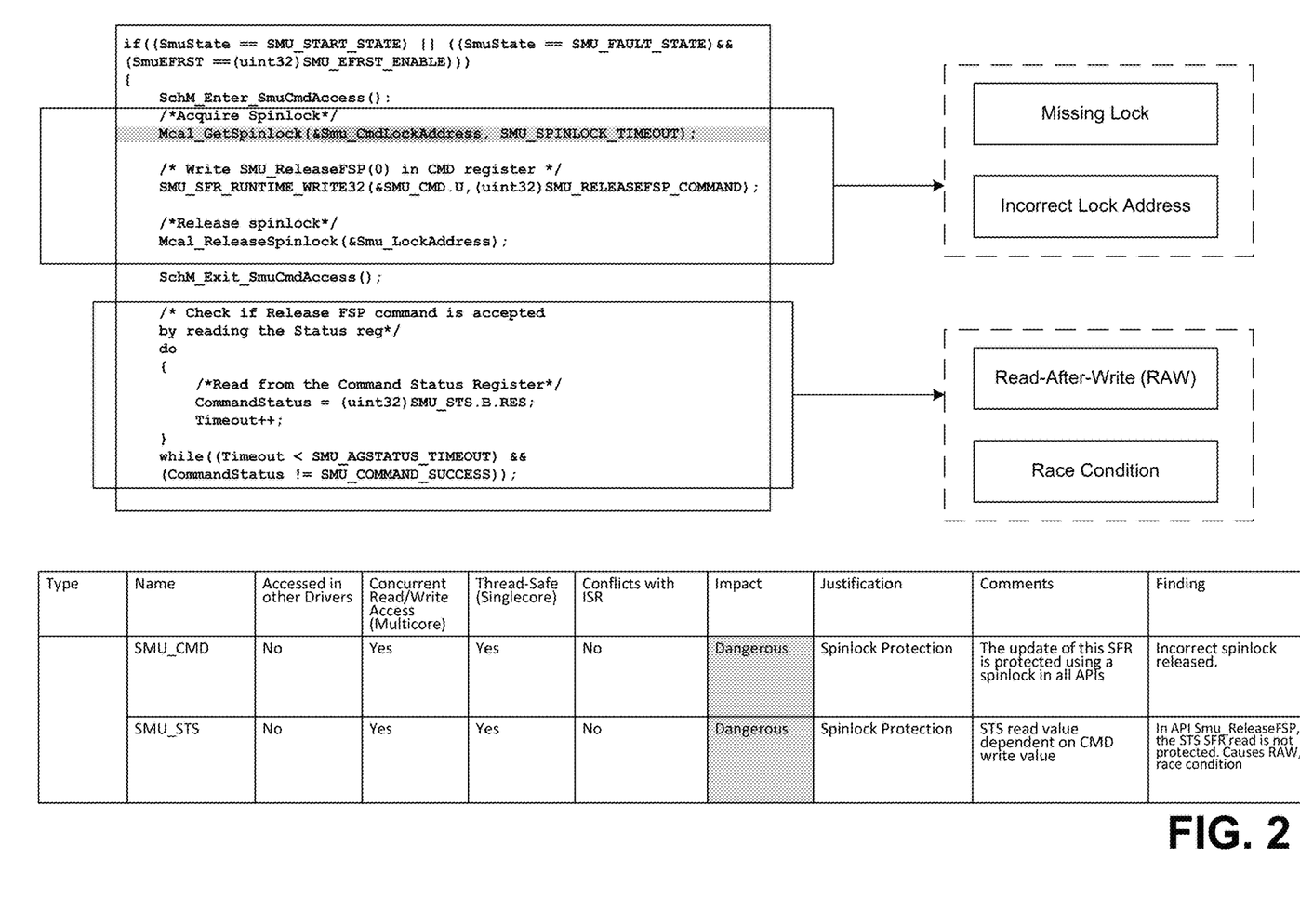
FIG. 2 is a diagram illustrating a first example of potential resource violations (top), along with a portion of an example report that can identify read and write accesses to SFRs/variables that can potentially lead to resource violations, according to various aspects described herein.
Figure 3:
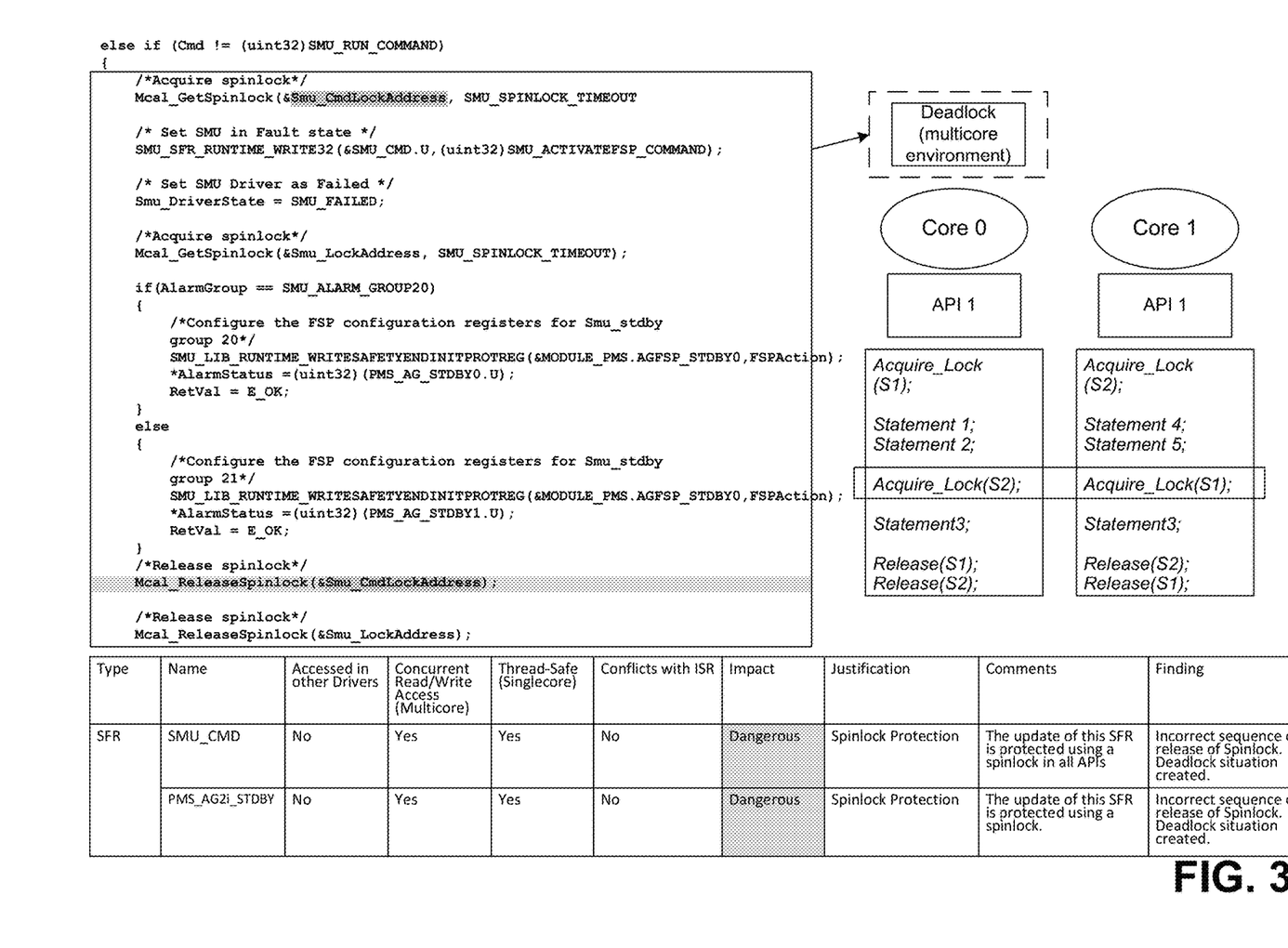
FIG. 3 is a diagram illustrating a second example of potential resource violations (top), along with a portion of an example report that can identify read and write accesses to SFRs/variables that can potentially lead to resource violations, according to various aspects discussed herein.

Referring to FIG. 2, illustrated is a diagram illustrating a first example of potential resource violations (top), along with a portion of an example report that can identify read and write accesses to SFRs/variables that can potentially lead to resource violations, according to various aspects discussed herein. Referring to FIG. 3, illustrated is a diagram illustrating a second example of potential resource violations (top), along with a portion of an example report that can identify read and write accesses to SFRs/variables that can potentially lead to resource violations, according to various aspects discussed herein.

The static data (e.g., findings/reports 116) can identify potential resource violation(s), associated HW-SW sequence(s) (e.g., in semi-formal notation, etc.), and proposed mitigation measure(s). The static data can be input to a dynamic phase/portion of a multi-core resource violation checker 122. Additionally, HW trace data 124 obtained from the multi-core system (at least in connection with the shared resources subject to potential resource violations) can be provided to a user buffer 126, from which it can be provided as input to dynamic resource violation checker 122. The HW trace data can comprise the actual read and write accesses to those shared resource(s) by the SW as executed on the multi-core system.

Dynamic multi-core resource violation checker 122 can analyze the static data (e.g., each of the potential resource violations, in connection with the associated HW-SW sequences, mitigation measures, etc.) in connection with the HW trace data to determine whether an actual resource violation occurs (e.g., whether or not the mitigation measure(s) are sufficient). This analysis and determinations can be performed continuously until completion, periodically, and/or in response to one or more on-demand checks 128 received from a user. If the checker 122 determines that one or more actual resource violations is present, one or more user notifications 130 can be generated (e.g., one for each violation, a single notification indicating all violations, a single notification indicating all violations in an associated period or in response to a single on-demand check, etc.).

These notifications 130 can comprise one or more of SMU (safety management unit) alarm(s), interrupt(s), trap(s), etc.

Figure 4:
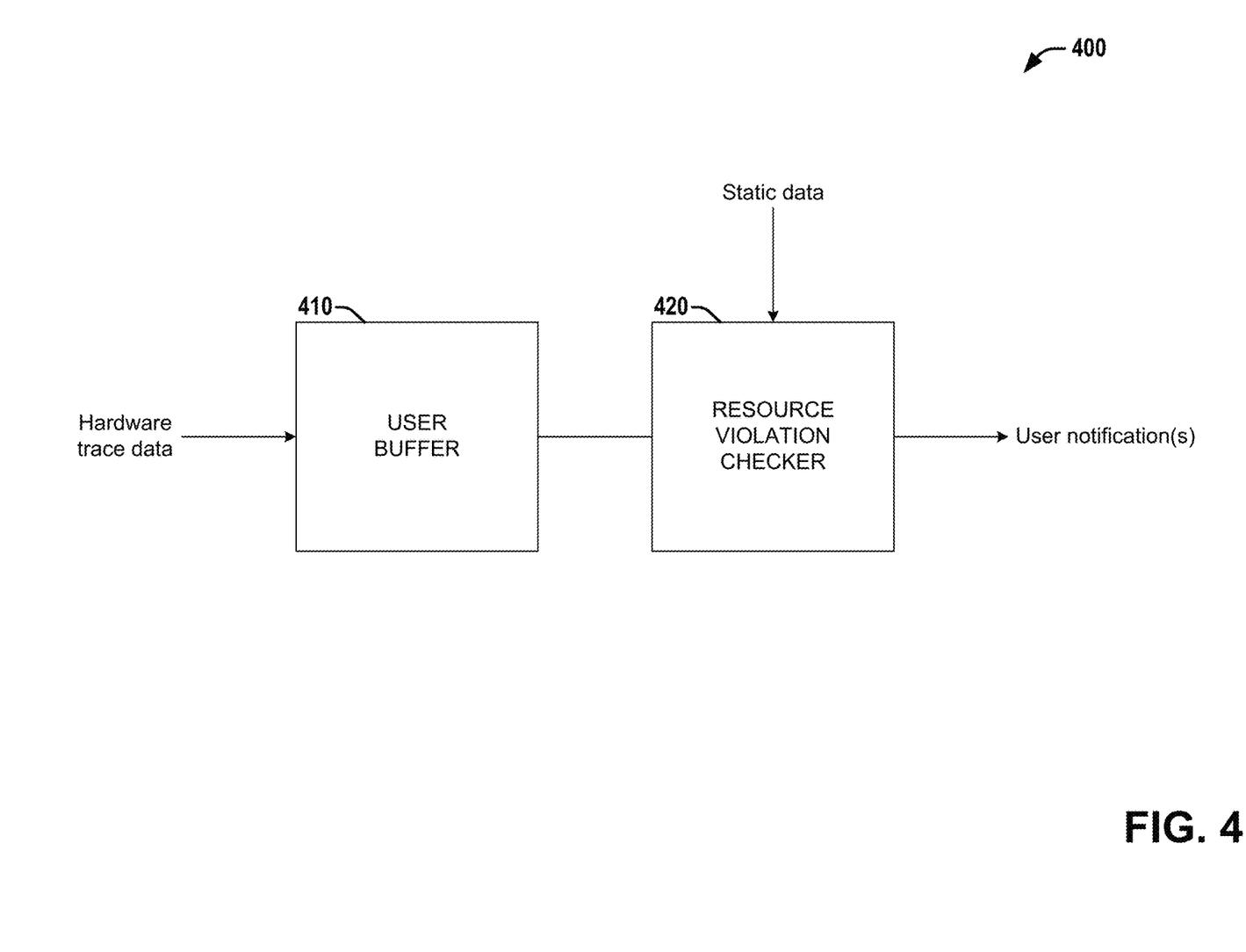
FIG. 4 is a block diagram illustrating an example system that facilitates shared resource analysis for a multi-core system, according to various aspects discussed herein.

Referring to FIG. 4, illustrated is a diagram of an example system 400 that facilitates shared resource analysis for a multi-core system, according to various aspects discussed herein. System 400 can comprise a user buffer 410 (e.g., which can perform functions described in connection with user buffer 126) and resource violation checker 420 (e.g., which can perform functions described in connection with checker 114 and/or checker 122).

User buffer 410 can receive hardware trace data for a multi-core system comprising actual read and write accesses in the software of the multi-core system as executed by the multi-core system, at least for one or more shared resources subject to potential resource violations. The one or more shared resources can be identified based on static data generated for or by (e.g., at least in part) resource violation checker 420.

Resource violation checker 420 can receive and/or generate at least in part static data that is based on an analysis of a multi-core system. The static data can identify one or more shared resources (e.g., SFR(s), variable(s), etc.) of the multi-core system that are potentially subject to one or more shared resource violations (e.g., concurrency issues, etc.) due to multiple write accesses. The static data (e.g., which can comprise semi-formal notation such as UML, etc.) can identify one or more potential resource violations of one or more shared resources, HW-SW sequences (e.g., sequences of read and write accesses to those shared resource(s), etc.) associated with those shared resources, and proposed mitigation measures for those potential resource violations.

Based on an analysis of the static data in connection with the HW trace data, resource violation checker 420 can make a determination for each of the one or more shared resources subject to potential resource violations as to whether those potential resource violation(s) are actual resource violation(s) to be addressed (e.g., whether the associated mitigation measure(s) are appropriate and/or sufficient, etc.). Resource violation checker 420 can perform the analysis and determination(s) either on-demand (e.g., in response to on-demand check(s) from a user), continuously, or periodically (e.g., according to a monitoring frequency, etc.). In response to determining that there are one or more actual resource violation(s) to be addressed, resource violation checker 420 can generate one or more associated user notifications (e.g., SMU alarm(s), interrupt(s), trap(s), etc.).

Figure 5:
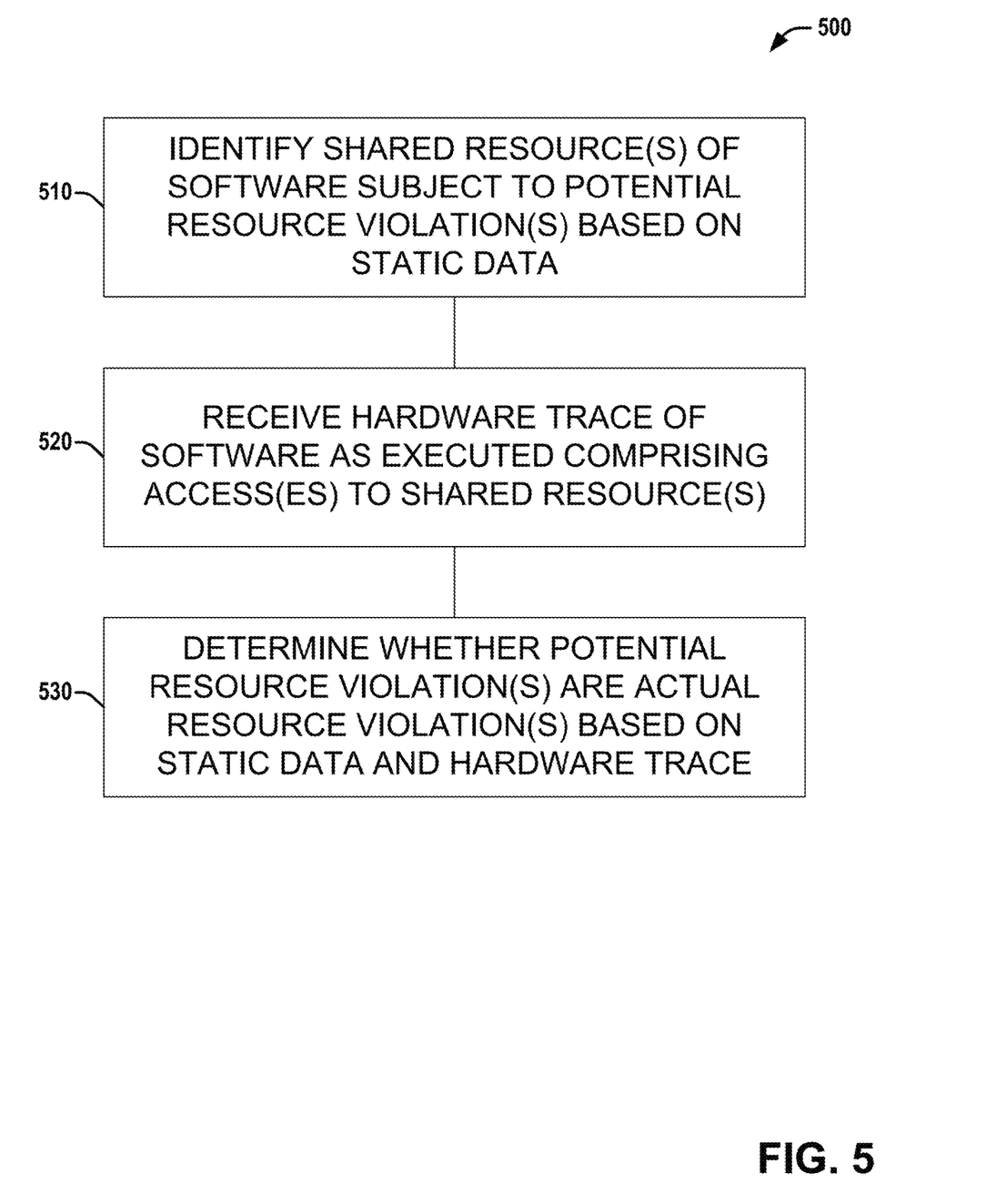
FIG. 5 is a flow diagram illustrating an example method that facilitates shared resource analysis for a multi-core system, according to various aspects discussed herein.

Referring to FIG. 5, illustrated is a flow diagram of an example method 500 that facilitates shared resource analysis for a multi-core system, according to various aspects discussed herein. In other aspects, a machine readable medium can store instructions associated with method 500 that, when executed, can cause a computer, etc. to perform the acts of method 500.

At 510, based on static data associated with a multi-core system, one or more shared resources (e.g., SFR(s), variable(s), etc.) can be identified that are subject to potential resource violations.

At 520, hardware trace data can be received comprising software as executed by the multi-core system, wherein the hardware trace data comprises at least read and write accesses to the one or more shared resources.

At 530, a determination can be made for each of the potential resource violations as to whether that potential resource violation is an actual resource violation (e.g., whether associated mitigation measures, if any, are appropriate/sufficient, etc.).

Additionally or alternatively, method 500 can include one or more other acts or features described herein in connection with various embodiments discussed herein.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system according to embodiments and examples described herein.

Example 1 is a computer-readable medium comprising instructions that, when executed, cause a computer to: identify, via static data, one or more shared resources of a multi-core system, wherein each of the one or more shared resources is subject to one or more associated potential resource violations, wherein the static data is based on an analysis of the multi-core system, wherein the static data identifies, for each shared resource of the one or more shared resources, each read access of that shared resource in a software of the multi-core system and each write access of that shared resource in the software of the multi-core system, and wherein each of the shared resources has two or more write accesses in the software; receive hardware trace data for the multi-core system that comprises, for each shared resource of the one or more shared resources, each read access of that shared resource in the software as executed by the multi-core system and each write access of that shared resource in the software as executed by the multi-core system; and make a determination, for each shared resource of the one or more shared resources, based on a comparison between the static data and the hardware trace data, whether at least one of the one or more associated potential resource violations of that shared resource is an associated resource violation of that shared resource.

Example 2 comprises the subject matter of any variation of any of example(s) 1, wherein the static data comprises semi-formal notation that indicates, for each shared resource of the one or more shared resources, each read access of that shared resource in the software of the multi-core system and each write access of that shared resource in the software of the multi-core system.

Example 3 comprises the subject matter of any variation of any of example(s) 1-2, wherein, for each shared resource of the one or more shared resources, the static data comprises one or more proposed mitigation measures for the one or more associated potential resource violations of that shared resource.

Example 4 comprises the subject matter of any variation of any of example(s) 1-3, wherein the instructions, when executed, further cause the computer to, for each shared resource of the one or more shared resources, generate a user notification in response to a determination that at least one of the one or more associated potential resource violations of that shared resource is the associated resource violation of that shared resource.

Example 5 comprises the subject matter of any variation of any of example(s) 4, wherein the notification is generated via one of a safety management unit (SMU) alarm, an interrupt, or a trap.

Example 6 comprises the subject matter of any variation of any of example(s) 1-5, wherein the static data comprises semi-formal notation.

Example 7 comprises the subject matter of any variation of any of example(s) 1-6, wherein the instructions, when executed, cause the computer to perform the comparison in response to one or more on-demand checks.

Example 8 comprises the subject matter of any variation of any of example(s) 1-6, wherein the instructions, when executed, cause the computer to continuously perform the comparison via continuous monitoring of the static data and hardware trace data.

Example 9 comprises the subject matter of any variation of any of example(s) 1-6, wherein the instructions, when executed, cause the computer to perform the comparison via periodic monitoring of the static data and hardware trace data according to a monitoring frequency.

Example 10 is a system, comprising: a resource violation checker configured to identify, via static data, one or more shared resources of a multi-core system, wherein each of the one or more shared resources is subject to one or more associated potential resource violations, wherein the static data is based on an analysis of the multi-core system, wherein the static data identifies, for each shared resource of the one or more shared resources, each read access of that shared resource in a software of the multi-core system and each write access of that shared resource in the software of the multi-core system, and wherein each of the shared resources has two or more write accesses in the software; and a user buffer configured to receive hardware trace data for the multi-core system and to send the hardware trace data to the resource violation checker, wherein the hardware trace data comprises, for each shared resource of the one or more shared resources, each read access of that shared resource in the software as executed by the multi-core system and each write access of that shared resource in the software as executed by the multi-core system, wherein the resource violation checker is further configured to make a determination, for each shared resource of the one or more shared resources, based on a comparison between the static data and the hardware trace data, whether at least one of the one or more associated potential resource violations of that shared resource is an associated resource violation of that shared resource.

Example 11 comprises the subject matter of any variation of any of example(s) 10, wherein the static data comprises semi-formal notation that indicates, for each shared resource of the one or more shared resources, each read access of that shared resource in the software of the multi-core system and each write access of that shared resource in the software of the multi-core system.

Example 12 comprises the subject matter of any variation of any of example(s) 10-11, wherein, for each shared resource of the one or more shared resources, the static data comprises one or more proposed mitigation measures for the one or more associated potential resource violations of that shared resource.

Example 13 comprises the subject matter of any variation of any of example(s) 10-12, wherein the resource violation checker is further configured to, for each shared resource of the one or more shared resources, generate a user notification in response to a determination that at least one of the one or more associated potential resource violations of that shared resource is the associated resource violation of that shared resource.

Example 14 comprises the subject matter of any variation of any of example(s) 13, wherein the notification is generated via one of a safety management unit (SMU) alarm, an interrupt, or a trap.

Example 15 comprises the subject matter of any variation of any of example(s) 10-14, wherein the static data comprises semi-formal notation.

Example 16 comprises the subject matter of any variation of any of example(s) 10-15, wherein the resource violation checker is configured to perform the comparison in response to one or more on-demand checks.

Example 17 comprises the subject matter of any variation of any of example(s) 10-15, wherein the resource violation checker is configured to continuously perform the comparison via continuous monitoring of the static data and hardware trace data.

Example 18 comprises the subject matter of any variation of any of example(s) 10-15, wherein the resource violation checker is configured to perform the comparison via periodic monitoring of the static data and hardware trace data according to a monitoring frequency.

Example 19 is a method, comprising: identifying, via static data, one or more shared resources of a multi-core system, wherein each of the one or more shared resources is subject to one or more associated potential resource violations, wherein the static data is based on an analysis of the multi-core system, wherein the static data identifies, for each shared resource of the one or more shared resources, each read access of that shared resource in a software of the multi-core system and each write access of that shared resource in the software of the multi-core system, and wherein each of the shared resources has two or more write accesses in the software; receiving hardware trace data for the multi-core system that comprises, for each shared resource of the one or more shared resources, each read access of that shared resource in the software as executed by the multi-core system and each write access of that shared resource in the software as executed by the multi-core system; and making a determination, for each shared resource of the one or more shared resources, based on a comparison between the static data and the hardware trace data, whether at least one of the one or more associated potential resource violations of that shared resource is an associated resource violation of that shared resource.

Example 20 comprises the subject matter of any variation of any of example(s) 19, further comprising generating a user notification in response to a determination that at least one of the one or more associated potential resource violations of that shared resource is the associated resource violation of that shared resource.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A computer-readable medium comprising instructions that, when executed, cause a computer to:
    identify, via static data, one or more shared resources of a multi-core system, wherein each of the one or more shared resources is subject to one or more associated potential resource violations, wherein the static data is based on an analysis of the multi-core system, wherein the static data comprises semi-formal notation that indicates, for each shared resource of the one or more shared resources, each read access of that shared resource in a software of the multi-core system and each write access of that shared resource in the software of the multi-core system, and wherein each of the shared resources has two or more write accesses in the software;
    receive hardware trace data for the multi-core system that comprises, for each shared resource of the one or more shared resources, each read access of that shared resource in the software as executed by the multi-core system and each write access of that shared resource in the software as executed by the multi-core system; and
    make a determination, for each shared resource of the one or more shared resources, based on a comparison between the static data and the hardware trace data, whether at least one of the one or more associated potential resource violations of that shared resource is an associated resource violation of that shared resource.

2. The computer-readable medium of claim 1, wherein, for each shared resource of the one or more shared resources, the static data comprises one or more proposed mitigation measures for the one or more associated potential resource violations of that shared resource.

3. The computer-readable medium of claim 1, wherein the instructions, when executed, further cause the computer to, for each shared resource of the one or more shared resources, generate a user notification in response to a determination that at least one of the one or more associated potential resource violations of that shared resource is the associated resource violation of that shared resource.

4. The computer-readable medium of claim 3, wherein the user notification is generated via one of a safety management unit (SMU) alarm, an interrupt, or a trap.

5. The computer-readable medium of claim 1, wherein the instructions, when executed, cause the computer to perform the comparison in response to one or more on-demand checks.

6. The computer-readable medium of claim 1, wherein the instructions, when executed, cause the computer to continuously perform the comparison via continuous monitoring of the static data and hardware trace data.

7. The computer-readable medium of claim 1, wherein the instructions, when executed, cause the computer to perform the comparison via periodic monitoring of the static data and hardware trace data according to a monitoring frequency.

8. A system, comprising:
    processing circuitry comprising a resource violation checker configured to identify, via static data, one or more shared resources of a multi-core system, wherein each of the one or more shared resources is subject to one or more associated potential resource violations, wherein the static data is based on an analysis of the multi-core system, wherein the static data comprises semi-formal notation that indicates, for each shared resource of the one or more shared resources, each read access of that shared resource in a software of the multi-core system and each write access of that shared resource in the software of the multi-core system, and wherein each of the shared resources has two or more write accesses in the software; and
    a user buffer circuit configured to receive hardware trace data for the multi-core system and to send the hardware trace data to the resource violation checker, wherein the hardware trace data comprises, for each shared resource of the one or more shared resources, each read access of that shared resource in the software as executed by the multi-core system and each write access of that shared resource in the software as executed by the multi-core system,
    wherein the processing circuitry comprising the resource violation checker is further configured to make a determination, for each shared resource of the one or more shared resources, based on a comparison between the static data and the hardware trace data, whether at least one of the one or more associated potential resource violations of that shared resource is an associated resource violation of that shared resource.

9. The system of claim 8, wherein, for each shared resource of the one or more shared resources, the static data comprises one or more proposed mitigation measures for the one or more associated potential resource violations of that shared resource.

10. The system of claim 8, wherein the processing circuitry comprising the resource violation checker is further configured to, for each shared resource of the one or more shared resources, generate a user notification in response to a determination that at least one of the one or more associated potential resource violations of that shared resource is the associated resource violation of that shared resource.

11. The system of claim 10, wherein the user notification is generated via one of a safety management unit (SMU) alarm, an interrupt, or a trap.

12. The system of claim 8, wherein the processing circuitry comprising the resource violation checker is configured to perform the comparison in response to one or more on-demand checks.

13. The system of claim 8, wherein the processing circuitry comprising the resource violation checker is configured to continuously perform the comparison via continuous monitoring of the static data and hardware trace data.

14. The system of claim 8, wherein the processing circuitry comprising the resource violation checker is configured to perform the comparison via periodic monitoring of the static data and hardware trace data according to a monitoring frequency.

15. A method, comprising:
    identifying, via static data, one or more shared resources of a multi-core system, wherein each of the one or more shared resources is subject to one or more associated potential resource violations, wherein the static data is based on an analysis of the multi-core system, wherein the static data comprises semi-formal notation that indicates, for each shared resource of the one or more shared resources, each read access of that shared resource in a software of the multi-core system and each write access of that shared resource in the software of the multi-core system, and wherein each of the shared resources has two or more write accesses in the software;

receiving hardware trace data for the multi-core system that comprises, for each shared resource of the one or more shared resources, each read access of that shared resource in the software as executed by the multi-core system and each write access of that shared resource in the software as executed by the multi-core system; and making a determination, for each shared resource of the one or more shared resources, based on a comparison between the static data and the hardware trace data, whether at least one of the one or more associated potential resource violations of that shared resource is an associated resource violation of that shared resource.

16. The method of claim 15, further comprising generating a user notification in response to a determination that at least one of the one or more associated potential resource violations of that shared resource is the associated resource violation of that shared resource.

\* \* \* \* \*